UNITED STATES PATENT OFFICE.

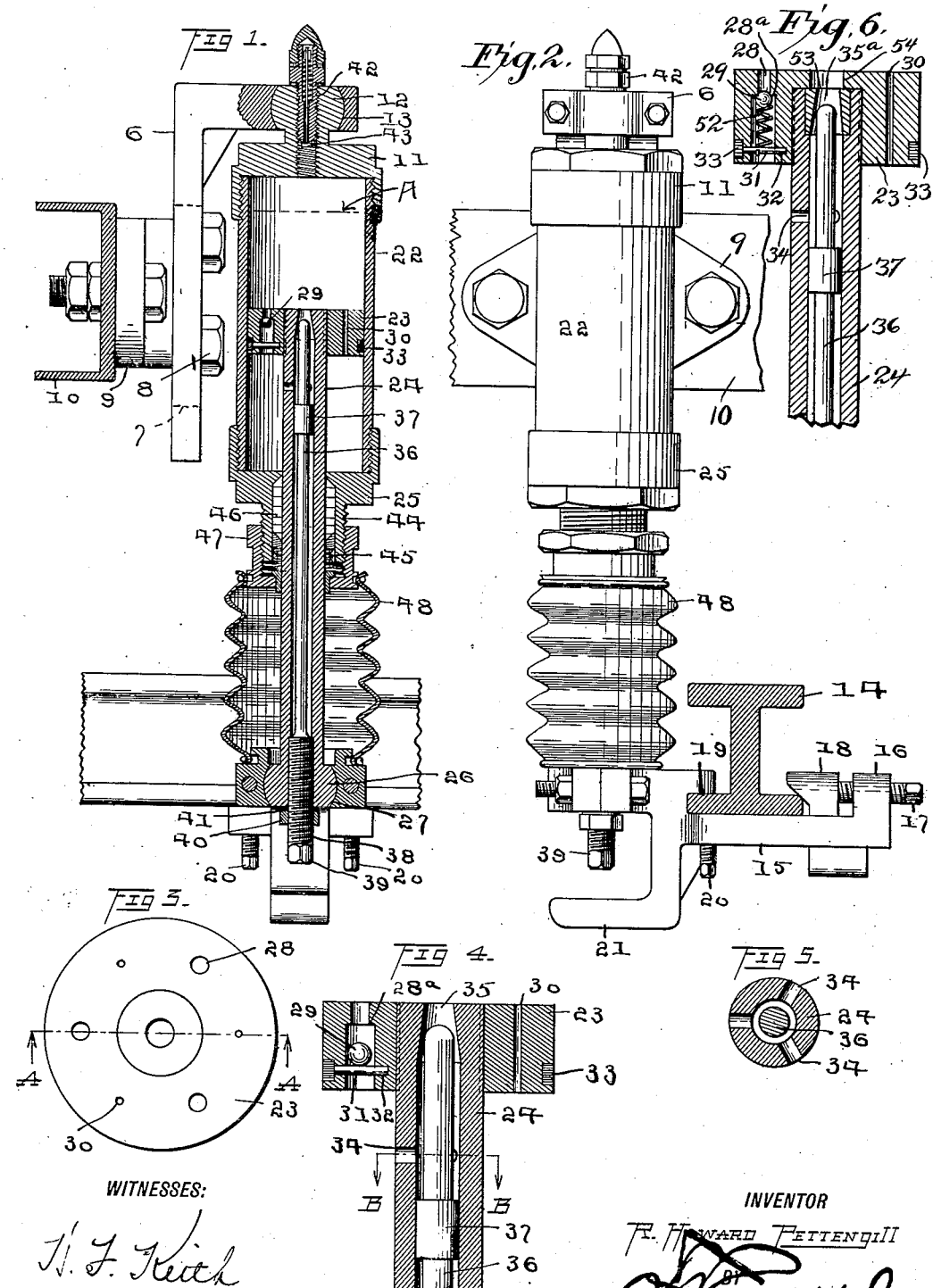

RALPH H. PETTENGILL, OF HAVERHILL, MASSACHUSETTS.

SHOCK-ABSORBER.

1,219,035.  Specification of Letters Patent.  Patented Mar. 13, 1917.

Application filed April 11, 1916. Serial No. 90,395.

*To all whom it may concern:*

Be it known that I, RALPH H. PETTENGILL, citizen of the United States of America, residing at Bradford district, Haverhill, in the county of Essex and State of Massachusetts, have invented certain new and useful Improvements in Shock-Absorbers; and I do hereby declare the following to be a full, clear, and exact description of the invention, such as will enable others skilled in the art to which it appertains to make and use the same.

When a motor vehicle is traveling at a comparatively high speed the wheels thereof when striking an obstruction have a tendency to bounce and leave the ground as is well known.

It is, therefore, one of the objects of the invention to provide a shock absorber to retard or eliminate the free bounding movement of the vehicle wheel without transmitting the first shock or any subsequent shock to the body of the vehicle.

Another object is the provision of a shock absorber which will effectively prevent the swift and objectionable rebound or recoil of the spring of the vehicle, but allow the spring to gradually or gently regain its normal position after having been compressed.

A further object of the invention is to provide a shock absorber which may be adjusted subsequent to attachment to a motor vehicle to give any desired degree of resistance to the movement of the vehicle relative to the axle thereof and so constructed that it may be adjusted to give any desired resistance to the movement in one direction relatively to the resistance to the movement in the opposite direction.

With this and other objects in view, the invention consists in the novel construction, combination and arrangement of parts as will be hereinafter specifically described, claimed and illustrated in the accompanying drawings, in which:

Figure 1 represents a fragmental transverse sectional view through a motor vehicle, illustrating a fragment of the chassis and axle and illustrating the improved shock absorber in longitudinal section, Fig. 2 represents a side elevation of the improved shock absorber, illustrating the vehicle axle in section, Fig. 3 represents a plan view of the piston removed, Fig. 4 represents a transverse sectional view through the piston on the line *a—a* of Fig. 3, Fig. 5 represents a detail sectional view through the piston rod on the line B—B of Fig. 4.

Fig. 6 represents a sectional view through a modified type of piston.

Referring to the drawings, wherein similar reference numerals indicate corresponding parts throughout the several views, the upper extremity of the shock absorber is attached to the longitudinal member 10 of the vehicle by an angular bracket 6, having a longitudinal slot 7 in the vertically disposed portion thereof receiving stud bolts 8, which are fitted in threaded apertures formed in an attaching plate 9, which latter is rigidly secured to the vehicle member 10. The horizontally disposed portion of the angular bracket 6 is formed with an opening 13 having a concave surface receiving a frusto-spherical head 12 carried by the cylinder head 11, whereby the latter is pivotally connected with the angular bracket.

The lower end of the shock absorber is attached to the axle 14 of the vehicle by a bracket 15, receiving the lower portion of the axle and provided with an upstanding lug 16, in which is threaded a screw 17. A clamping block 18 is rotatably secured to the inner extremity of the screw 17 and is provided with a beveled inner end for engagement with the axle 14, whereby the latter is rigidly clamped in the recess 19 formed in the bracket. The bracket is further secured against movement with relation to the axle by set screws 20 threaded therein and engaged with the axle.

The cylinder head or cap 11 is detachably connected with a cylinder 22 in which is reciprocably mounted a piston 23, carrying a rod 24 extending downwardly through the cylinder and the lower cylinder head 25 and formed with an enlargement 26 swivelly mounted in a socket or aperture 27 formed in a lateral extension of the bracket 15. An angular guard member 21 is formed upon the bracket 15 for protecting one of the adjustment elements of the shock absorber, as will become more fully apparent hereinafter.

The piston 23 is formed with a plurality of relatively large ports 28, having reduced upper terminals providing shoulders or valve seats 28ª, which are preferably inclined and adapted to be engaged by ball valves 29 during the downward movement of the piston within the cylinder to prevent the passage of liquid from the lower to the upper end of the cylinder. Free ports 30 of considerably less diameter than the ports 28 are also formed in the piston 23.

The ball valves 29 are retained in position in the ports 28 by pins 31 fitted in openings formed radially in the piston 23 and communicating at their outer ends with a circumferential groove in the piston receiving a packing ring 33 by which the pins are retained in position and the liquid is prevented from escaping between the piston and cylinder wall.

The piston rod 24 is of hollow formation and the bore at the upper end thereof adjacent the piston 23 is tapered or gradually restricted, as indicated at 35, and adapted to co-act with the rounded extremity of an adjustable rod 36 extending axially through the rod 24 for varying the width of the space between the rounded end of the rod 36 and the wall of the bore of the piston rod 24 for controlling the passage of liquid therethrough. At a point below the piston 23 the rod 24 is formed with a plurality of ports 34 and below the ports 34 the adjustable rod 36 is formed with an integral collar 37 snugly fitted in the bore of the piston rod 24 to close communication between the lower end of said bore and the cylinder 22. The lower extremity of the rod 36 is enlarged and formed with external screwthread 38 fitted in an internally screw threaded aperture formed in the enlargement 26 of the piston rod 24. The extreme lower end of the rod 36 is squared, as indicated at 39, to receive the jaws of a wrench and thus facilitate adjustment of the rod, which latter is secured in adjusted position by a lock nut 40 and gasket 41 engaged between the lock nut and the enlargement 26.

The heads 11 and 12 are formed with an axial opening 42 provided with internal screw threads receiving an externally screw threaded plug in which is mounted an approved type of outwardly closing check valve 43 to prevent the escape of air from the interior of the cylinder. The cylinder is filled with compressed air by applying a pump to the exposed end of the plug and the lower portion of the cylinder contains oil or other suitable liquid, the approximate level of the liquid in the cylinder being indicated in Fig. 1 by a broken line designated by the letter A.

The lower head 25 of the cylinder is formed with a bore of greater diameter than that of the rod 24, thereby providing a stuffing box 44, receiving packing rings 46, which are snugly retained in engagement with the rod 24 by an expansion spring 45 engaged between the packing rings and a nut 47 fitted on the cap 25. The portion of the piston rod 24 extending between the nut 47 and the bracket 15 is inclosed in a collapsible casing 48.

During compression of the vehicle springs, not shown, the piston 23 moves upwardly within the cylinder 22 and this movement of the piston with relation to the cylinder displaces a certain portion of the volume of air contained in the cylinder, thereby increasing the pressure within the cylinder and consequent resistance to the continued rise of the piston in the cylinder. As the rate of increase of resistance to the upward movement of the piston depends upon the decrease in the volume of air in the cylinder, caused by the piston entering the cylinder, it is evident that the shock absorber may be readily and accurately adjusted to any desired rate of increase in the resistance to the upward movement of the piston in the cylinder, during the compression of the vehicle spring by properly proportioning the volume of liquid and air in the cylinder with the piston in its given or normal position. The amount of resistance to the initial and continued rise of the piston in the cylinder may be attained by filling the cylinder with air under the desired pressure, through the valve 43. During the recoil of the spring, the piston 23 is moved downwardly within the cylinder 22 is yieldably resisted by the liquid contained in the lower portion of the cylinder, which is prevented from passing through the ports 28 by the valves 29, which latter automatically close during the down-stroke of the piston. A certain quantity of the liquid is allowed to pass into the chamber above the piston through the ports 34 and between the adjustable rod 36 and the piston rod 24. It is evident that the space between the rod 36 and piston rod 24 may be varied to accurately control the down stroke of the piston within the cylinder by adjusting the rod 36 within the piston rod 24.

In the type of piston illustrated in Fig. 6 the valve 29 is normally retained closed by the tension of a spring 52 and the end of the bore of the piston rod 24 is enlarged to receive a seat 35ª adapted to receive the rounded end of the rod 36.

What I claim is:

1. A shock absorber having a cylinder to be attached through a ball and socket joint to the frame of an automobile, and adapted to contain a portion of liquid, and a portion of air, the said cylinder having an inlet for inserting liquid, and an air valve by means of which the cylinder may be made to contain any required air pressure, a ported piston within the cylinder, and balls for closing said ports during the down stroke of the piston, said balls being contained in cages formed within the piston, and being prevented from leaving the same by pins, contained in holes drilled in the piston from an annular groove in the periphery thereof, said annular groove containing a split spring ring to prevent the pins from coming out, and also forming a tight sliding fit between the piston and the cylinder, a hollow piston rod connected to the piston and projecting through the lower end of the cylinder to be attached through a ball and socket joint to the axle of the automobile, said hollow piston rod having ports communicating with the cylinder below the piston and having a portion of its inside diameter tapered near the upper end, forming a tapered port communicating with the cylinder above the piston, and a rod, within the hollow piston rod projecting below the same, and screw threaded thereto, the upper end of said rod entering the tapered portion of the hollow piston rod and controlling the said tapered port.

2. In a shock absorber, the combination with a cylinder to contain a portion of liquid and a portion of air, of a piston therein, said piston having a plurality of ports, and balls for closing said ports, said balls being contained in cages formed within the piston, and being prevented from leaving same by pins, contained in holes drilled in the piston from an annular groove in the periphery thereof, a split spring ring positioned in the groove to prevent the pins from coming out, and also forming a tight sliding fit between the piston and the cylinder.

3. In a shock absorber the combination with a cylinder to contain a portion of liquid and a portion of air, of a piston therein, said piston having a plurality of ports, and balls for closing said ports, said balls being contained in cages formed within the piston, and held in place and cushioned in their opening movement by helical springs, one end bearing against said balls and the other end being twisted in the form of rings, said rings encircling pins, contained in holes, drilled in the piston from an annular groove in the periphery thereof, a split spring ring positioned in said groove to prevent the pins from coming out and also forming a tight sliding fit between the piston and the cylinder.

4. In a shock absorber having a cylinder to contain a portion of liquid and a portion of air, a ported piston therein and valves for closing said ports, the combination with a hollow piston rod connected to the piston, said hollow piston rod having ports communicating with that part of the cylinder through which the piston rod travels, and having a portion of its inside diameter tapered near the piston, forming a tapered port communicating with the cylinder beyond the piston, of a rod within the hollow piston rod, projecting beyond the lower end thereof and screw threaded thereto, the interior end of the rod entering the tapered portion of the hollow piston rod, controlling said tapered port.

5. In a shock absorber having a cylinder to contain a portion of liquid and a portion of air, a ported piston therein and valves for closing said ports, the combination with a hollow piston rod connected to the piston, said hollow piston rod having ports communicating with that part of the cylinder through which the piston rod travels, and having a portion of its inside diameter bored out from the interior end thereof, and a tapered port inserted therein, said tapered port having its largest inside diameter, approximately the same as the inside diameter of the said hollow piston rod, and communicating with the cylinder beyond the piston, said tapered port being held in place by a flange on the piston, of a rod within the hollow piston rod projecting beyond the exterior end thereof and screw threaded thereto, the interior end of the rod entering the tapered port before mentioned and controlling the same.

6. In a shock absorber including a cylinder to contain a portion of liquid and a portion of air, a ported piston therein, and valves for closing said ports, the combination with a hollow piston rod connected with the piston, said hollow piston rod having ports communicating with that part of the cylinder through which the piston rod travels, and having a portion of its inside diameter tapered near the piston forming a tapered port communicating with the cylinder above the piston, of an adjustable rod positioned within the hollow piston and entering the tapered portion thereof to control the passage of liquid through the hollow piston rod.

In testimony whereof I affix my signature in presence of two witnesses.

RALPH H. PETTENGILL.

Witnesses:
JAMES E. KNIPE,
LOUIS H. GILES.